United States Patent
Müller et al.

(10) Patent No.: US 8,182,040 B2
(45) Date of Patent: May 22, 2012

(54) FORWARD TILTABLE MOTOR VEHICLE SEAT WITH HINGE MOUNTINGS

(75) Inventors: Andreas Müller, Düsseldorf (DE); Michael Kaiser, Wuppertal (DE); Andras Hoffmann, Wülfrath, WA (US)

(73) Assignee: C. Rob. Hammerstein GmbH & Co. KG, Solingen (DE)

( * ) Notice: Subject to any disclaimer, the term of this patent is extended or adjusted under 35 U.S.C. 154(b) by 154 days.

(21) Appl. No.: 12/258,443

(22) Filed: Oct. 26, 2008

(65) Prior Publication Data

US 2009/0108658 A1 Apr. 30, 2009

(30) Foreign Application Priority Data

Oct. 26, 2007 (DE) .......................... 10 2007 051 643
Nov. 21, 2007 (DE) .......................... 10 2007 056 173

(51) Int. Cl.
*B60N 2/02* (2006.01)
*B60N 2/42* (2006.01)
(52) U.S. Cl. .............. 297/378.11; 297/216.1; 297/378.1
(58) Field of Classification Search ............... 297/216.1, 297/216.16, 216.19, 378.1, 378.11, 378.12, 297/378.13, 378.14
See application file for complete search history.

(56) References Cited

U.S. PATENT DOCUMENTS

| | | | |
|---|---|---|---|
| 5,100,202 A * | 3/1992 | Hughes | 297/378.11 |
| 6,296,306 B1 * | 10/2001 | Specht et al. | 297/216.14 |
| 2002/0050733 A1 * | 5/2002 | Hansel et al. | 297/367 |
| 2003/0080601 A1 * | 5/2003 | Charras et al. | 297/378.12 |
| 2005/0046261 A1 * | 3/2005 | Grable et al. | 297/378.1 |
| 2006/0055219 A1 * | 3/2006 | Heimann et al. | 297/276 |

FOREIGN PATENT DOCUMENTS

DE 10 2006 028 899 A1 1/2007

* cited by examiner

*Primary Examiner* — David Dunn
*Assistant Examiner* — Philip Gabler
(74) *Attorney, Agent, or Firm* — McCarter & English, LLP

(57) ABSTRACT

A forward tiltable motor vehicle seat having a seat carrier, a seat back and a hinge mounting arranged therebetween. The hinge mounting has an upper hinge arm connected to the seat back and a lower hinge arm hinged to the seat carrier about a forward tilt axis. The hinge mounting comprises a locking device on one seat side and at least one detent bight that is arranged to move together with the upper hinge arm on the other seat side. A movable detent part is provided and comprises at least one detent projection that: cooperates with the detent bight, is normally not engaged with the detent bight, and when the seat back is tilted forward about the forward tilt axis, is at least ready for engagement with the detent bight or engaged therewith.

14 Claims, 7 Drawing Sheets

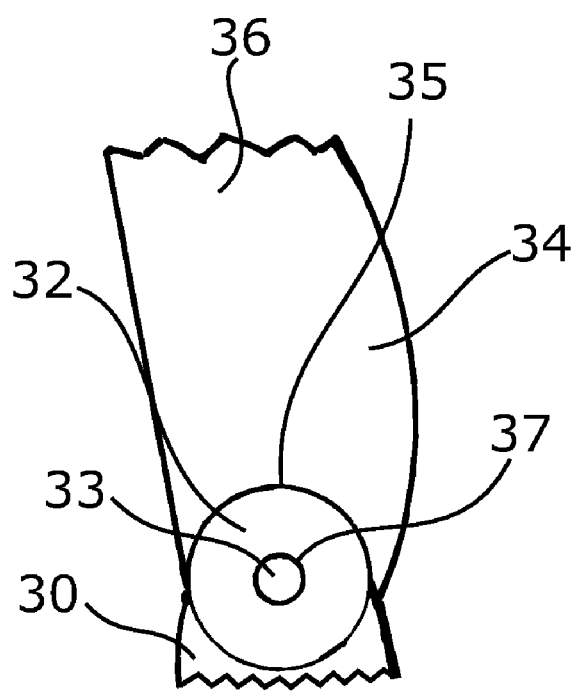
Fig. 8
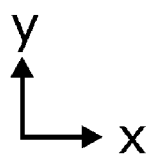

FORWARD TILTABLE MOTOR VEHICLE SEAT WITH HINGE MOUNTINGS

CROSS-REFERENCE TO RELATED APPLICATIONS

This application claims priority to German Application Nos. DE 10 2007 051 643.8, filed Oct. 26, 2007 and DE 10 2007 056 173.5, filed Nov. 21, 2007, which are hereby incorporated by reference in their entirety as part of the present disclosure.

BACKGROUND OF THE INVENTION

The invention relates to a forward tiltable motor vehicle seat with a seat carrier and with a seat back, a hinge mounting being associated with the seat back and having a) an upper hinge arm connected to the seat back, b) a lower hinge arm hinged to the seat carrier about a forward tilt axis and c) comprising a locking device on one seat side only, the other seat side being connected to the lockable seat side by a shaft.

A such type motor vehicle seat has been known from DE 10 2006 028 899 A1. In particular for motor vehicles having only one door on each vehicle side and also having rear seats, motor vehicle seats that can be readily displaced forward are needed for ease of access to the rear seats. The prior art motor vehicle seat can be tilted forward about the forward tilt axis; the seat back can be actuated quickly. The incline of the seat back is adjusted by the hinge mounting within a range of adjustment. In all there are thus provided two pivot axes for the seat back.

The problem of this construction is that the two seat sides exhibit different stability characteristics. On the locked seat side, the seat back takes quite high loads, the other side, which is retained only passively, cannot absorb so high loads. It may also cause the seat back to twist. Loads occur in particular if there is a load behind the motor vehicle seat of concern, for example a heavy parcel of a larger size or a passenger may be seated there.

This problem occurs in particular when the seat back is in the tilted forward condition, when quite large and heavy items are being placed behind the motor vehicle seat of concern. Additionally, the seat back has an incline so that, when yielding, the body stowed behind the seat back can slip upward. In normal driving, the different stiffness of the two sides is not noticeable, but it becomes so in the event of an accident.

Accordingly, it is the object of the invention to develop the motor vehicle seat locked on one side of the type mentioned herein above in such a manner that, on the seat side that has not been locked, the seat back also has sufficient strength, at least in crash events and/or at least in the forward tilted condition of the seat back.

SUMMARY OF THE INVENTION

In view of the motor vehicle seat of the type mentioned herein above, this object is solved in that the hinge mounting has on the other seat side at least one detent bight that moves together with the upper hinge arm, and that there is provided a movable detent part comprising at least one detent projection that cooperates with the detent bight, is normally not engaged with the detent bight and is, in a position of the seat back in which the seat back is tilted forward about the forward tilt axis, at least ready for engagement with the detent bight or engaged therewith.

The invention allows for direct locking of the other seat side as well, this at least in case of an acceleration due to an accident and/or in case of a forward tilted seat back.

In a first embodiment, a cam, which is needed anyway for locking, simultaneously forms the detent part. For this purpose, the cam additionally has the detent projection the known prior art cam does not have. The cam is now controlled in such a manner, in particular by a cam holder, that it is in detent engagement with the detent bight of the hinge mounting in its release position. As a result, the hinge mounting is also locked on the other, passive side.

In another embodiment, the detent part is a mass part that can move when subject to accelerations. It remains inactive up to a certain value of an acceleration, above a given acceleration value it becomes active and can interact with the detent bight. The mass part forms the at least one detent projection, which is capable of engaging in the at least one detent bight.

The mass part is thereby preferably biased by a spring which normally retains it in the release position. The force of this spring is only overcome above the dictated acceleration value for the mass part to be capable of actively cooperating with the detent bight. It is preferred that the spring is a dead center spring, which is also referred to as a snap spring and which urges elastically the mass part into engagement with the detent bight in the stop position. As a result, the mass part is prevented from rebounding when engaging the detent bight.

Both alternatives, the cam and the mass part, can simultaneously be provided on the passive seat side. It is understood that the invention is not needed on the active seat side.

The cam blocks the movement of the seat back toward the front. It ensures a zero clearance fit of this blocking; accordingly, its stop position is not exactly given but depends on the respective circumstances and also on the wear. Further, there is provided a limit stop at the lower hinge arm for limiting the movement of the lower hinge arm toward the back.

The invention is particularly suited for forward tiltable motor vehicle seats with manual Easy Entry. It is particularly conceived for a second row of seats behind which at least one additional row of seats is located.

Other features and advantages will become more apparent upon reviewing the appended claims and the following non restrictive description of embodiments of the invention, given by way of example only with reference to the drawing. In the drawing:

BRIEF DESCRIPTION OF THE DRAWINGS

FIG. 8: shows a schematic side view of a motor vehicle seat opposite the side shown in FIGS. 1-7.

DETAILED DESCRIPTION OF THE INVENTION

Figure 1:
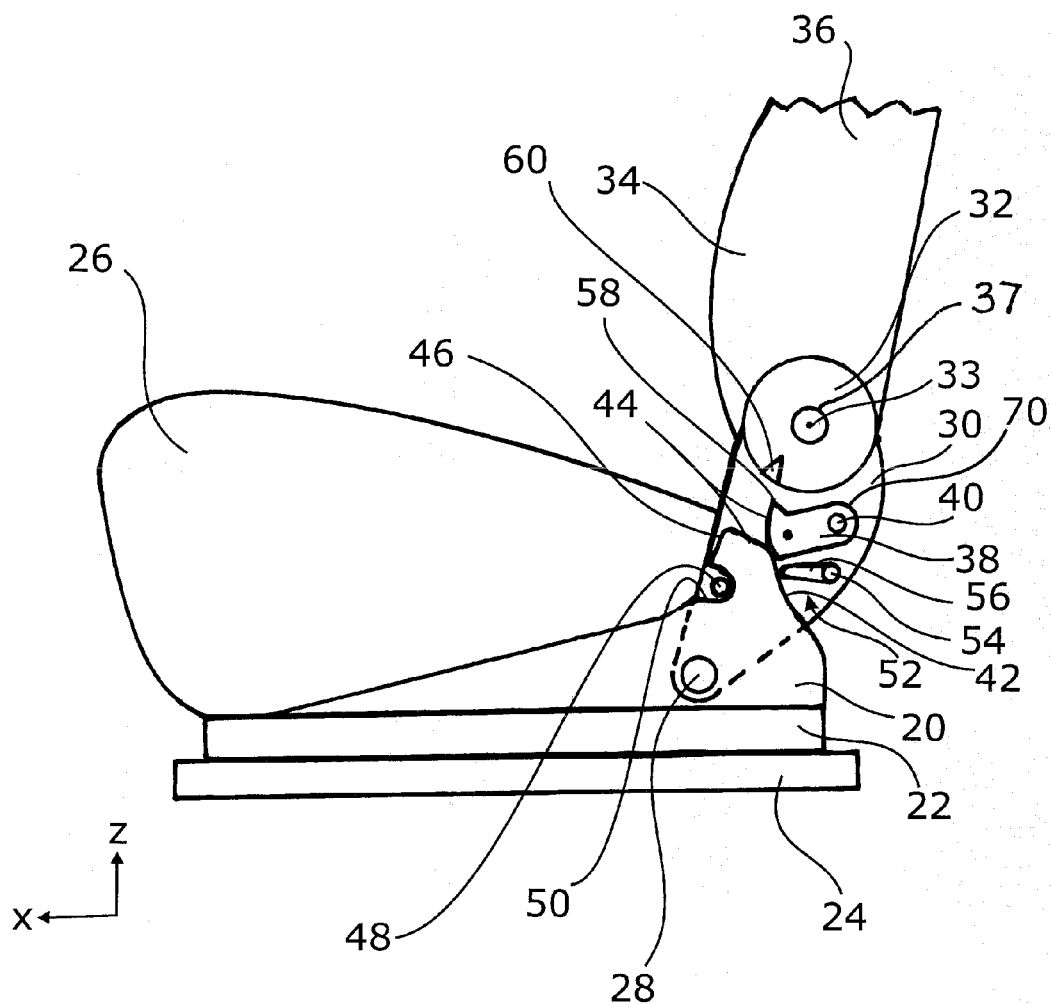
FIG. 1: shows a schematic side view of a motor vehicle seat.

Only the essential elements of an actually known motor vehicle seat are illustrated in the Figs. They show a seat carrier 20 that is carried by an underframe. The underframe is illustrated by a pair of rails having a top rail 22 and a bottom rail 24. The bottom rail 24 is intended to be fastened to an underbody (not shown) of a motor vehicle.

The seat carrier 20 carries a seat part 26. On the seat carrier 20 there is further formed a forward tilt axis 28 to which a lower hinge arm 30 of a hinge mounting 32 is hinge-linked. The hinge mounting 32 further has an upper hinge arm 34 that is solidly connected to a seat back 36. The incline of the seat back 36 can be adjusted about the axis 33 of the hinge mounting 32 within a range of adjustment.

At the lower hinge arm 30, a cam 38 is hinge-linked to a cam axis 40. It cooperates with a clamping flank 42 that is formed on the seat carrier 20. Toward the top, it merges into an upper flank 44 that delimits the seat carrier toward the top; it is adjoined with a front flank 46 toward the front, in the x direction. These flanks 42 through 46 define an upward protruding projection (in the z direction) of the seat carrier 20.

The cam axis 40 is located outside of the range of movement of this projection, in FIG. 1, the cam 38 is in the stop position, it has a rounded cam flank which rests against the clamping flank 42. As a result, the lower hinge arm 30 is blocked toward the front and is thus prevented from tilting forward about the forward tilt axis 28. The movement in the opposite direction of pivotal movement is blocked by cooperation of a limit stop 48 disposed on the lower hinge arm 30 and a limit stop flank 50, which is part of the front flank 46.

An actuation mechanism that has not been illustrated herein is associated with the cam 38; it is configured according to prior art. It makes it possible to pull the cam free from the stop position shown into the release position shown in FIG. 2. An elastic means is further preferably associated with the cam 38, the elastic means biasing the cam anti-clockwise, thus maintaining the clamping position shown in FIG. 1.

If the cam 38 is pivoted from the position shown in FIG. 1 into its release position, it is located outside of the range of movement of the projection 42 through 46. The lower hinge arm 30 can now be pivoted forward about the forward tilt axis 28 into the position shown in FIG. 2. The angular position of the seat back 36 depends on the adjustment of the hinge mounting 32.

Figure 2:
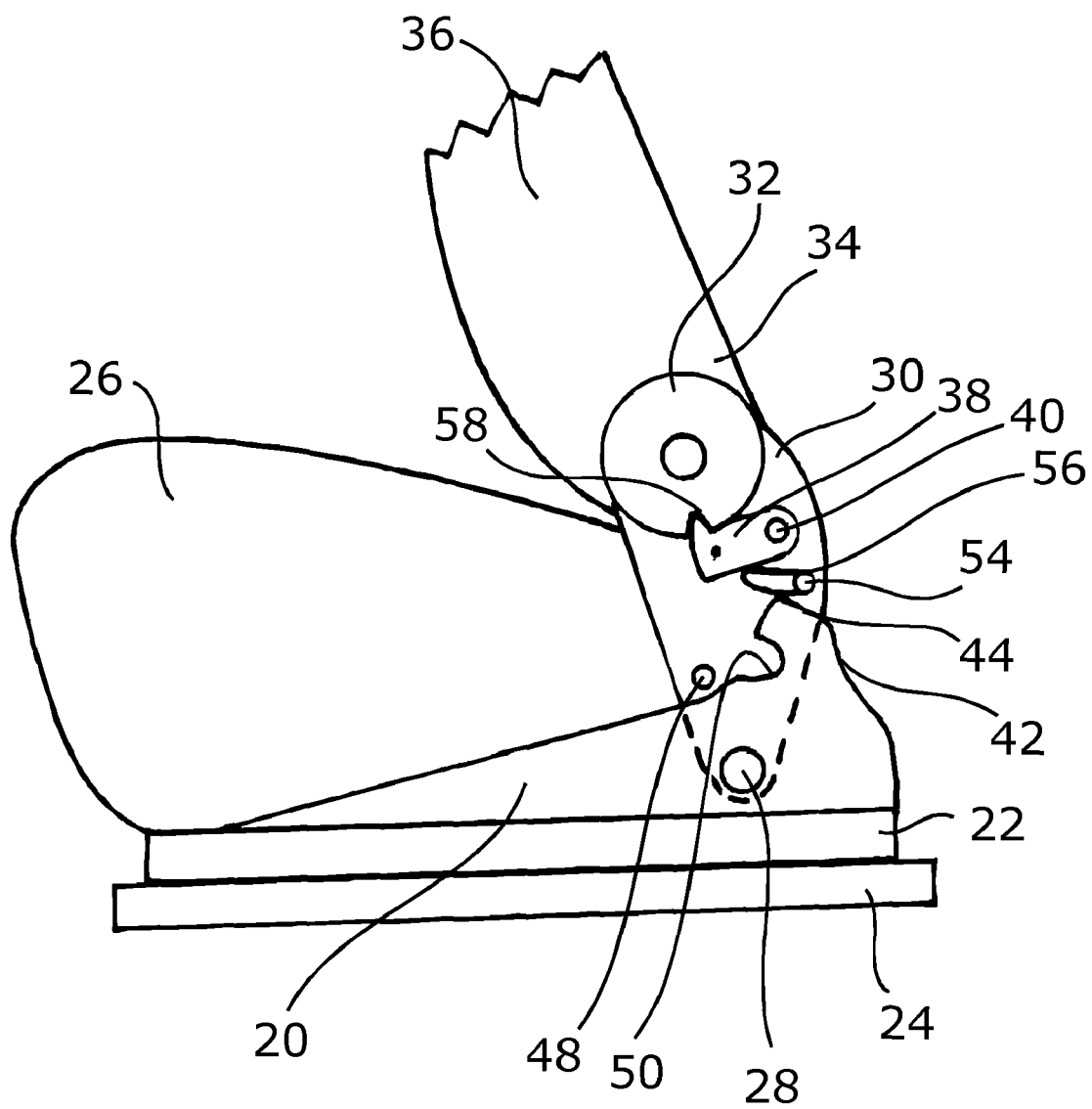
FIG. 2: shows a view according to FIG. 1, the seat back now being in the forward tilted position; it is tilted forward about the forward tilt axis.

The explanations given herein above apply to all three exemplary embodiments. Herein after, the first exemplary embodiment shown in the FIGS. 1 and 2 will be discussed in closer detail:

The detent part is formed from the cam 38. A detent projection 58 is formed at the cam 38, it is located at an upper flank. A detent bight 60 is associated therewith in the hinge mounting 32. The detent bight is connected to the upper hinge arm 34 so that it moves therewith relative to the lower hinge arm 30. As shown in FIG. 2, the detent projection 58 is engaged with the detent bight 60 in the forward tilted position. The hinge mounting 32 is only locked on the other seat side; on the seat side shown, which is equipped with the cam 38, the hinge mounting is passive. The illustrated seat side is retained in a known way by a cross tie or a shaft 37, the angular position is fixed by the hinge mounting 32 on the other seat side. This shaft 37 can twist. Accordingly, the seat side that is not directly stopped is mechanically softer than the other seat side. This may cause problems. If there is a passenger or more specifically a cargo to be transported behind the motor vehicle seat considered, and if the seat has the position shown in FIG. 2, it is possible that the stop by the unilateral hinge mounting 32 will not suffice. According to the developed embodiment, the not directly stopped seat side is also stopped by cooperation of the detent projection 58 and the detent bight 60 so that there is also a high stopping force and as a result thereof high safety on this seat side.

A cam holder 52 is associated with the cam 38. It is in particular configured to be elastic. The cam holder 52 serves to allow engagement of detent projection 58 and detent bight 60 on the one side and to keep it on the other side. It is located underneath the cam 38. The cam holder 52 comprises a pin 54 that is located outside of the range of movement of the projection 42 through 46 and is disposed on the lower hinge arm 30. It is connected with a resilient element 56 that is configured to be an arm pivotal about the pin 54 or a spring body such as a leaf spring for example. This movable element is located within the range of movement of the projection. In the position shown in FIG. 1, it lies with a free end at the clamping flank 42; this occurs underneath the cam 38 and without contact with the cam 38. The abutment on the clamping flank 42 is outside of the range of self-locking. During a forward tilt from the position shown in FIG. 1 into the position shown in FIG. 2, the free end of the element 56 glides along the clamping flank 42 and via the top flank 42 into the position shown in FIG. 2. During this movement, the free end contacts an underside of the cam 38 and remains in contact so that the cam holder 52 supports the cam 38 as shown in FIG. 2. As a result, the cam 38 cannot fall downward, meaning it cannot come to bear against the front flank 46.

Figure 3:
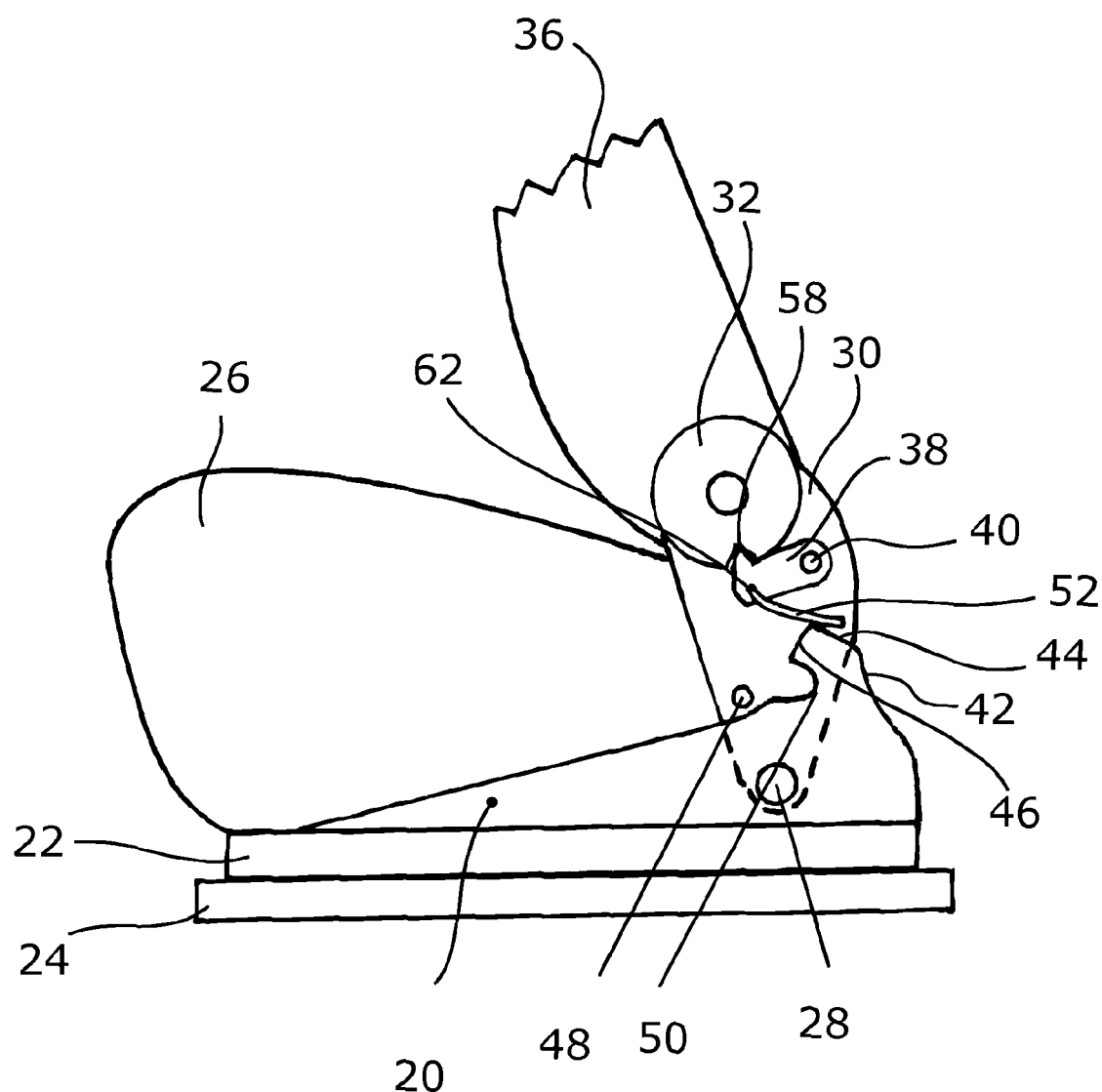
FIG. 3: shows a view like FIG. 2, but for a second exemplary embodiment, the cam holder is now formed by a leaf spring.

The second exemplary embodiment shown in FIG. 3 differs from the first exemplary embodiment by the fact that the cam holder 52 is now connected to the cam 38. In the cam 38 there is formed a slot 62 that is located opposite the detent projection 58 and that extends at an angle. A leaf spring forming the cam holder 52 is fastened therein. Like in all the exemplary embodiments, the flanks, in particular the clamping flank 42 and the upper flank 44, extend continuously and are as far as practicable rounded for the cam holder 52 to be capable of traveling along these flanks.

Figure 4:
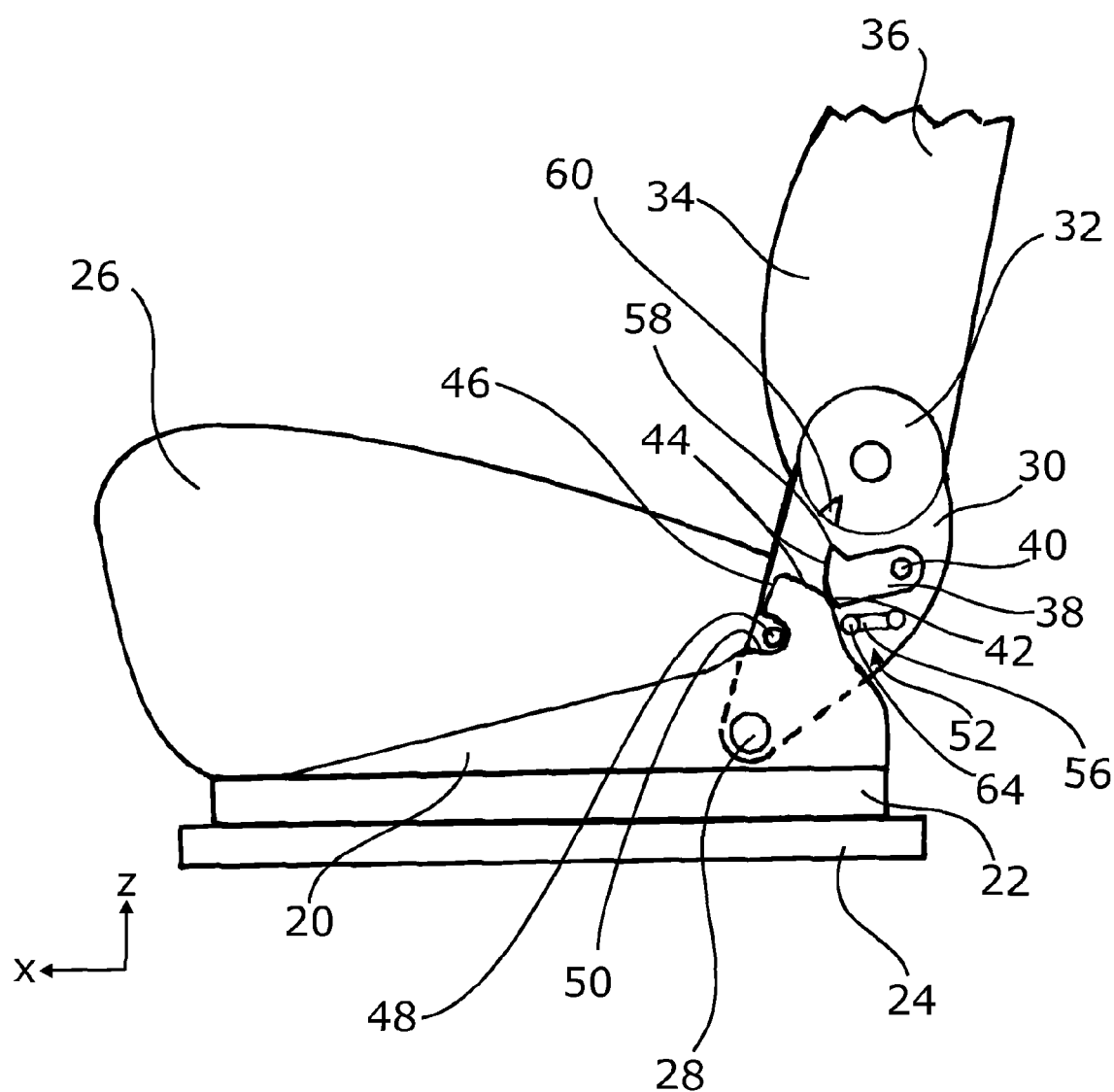
FIG. 4: is a view according to FIG. 1, but for a third exemplary embodiment, the cam holder now has a roll on its front side.

In the third exemplary embodiment shown in FIG. 4, a roll 64 is mounted to the free end of the cam holder 52. For the rest, the cam holder 52 is similar to the first exemplary embodiment. Like in the first exemplary embodiment, the roll 64 senses the course of the flanks 42 and 44. The position of the cam holder 52 is controlled as a result thereof. Insofar, the flanks 42 and 44 form control flanks for the cam holder 52. The roll 64 preferably always remains in contact with these flanks 42, 44. It appears that there is no self-locking, the cam holder 52 can move along the flanks 42, 44.

Figure 5:
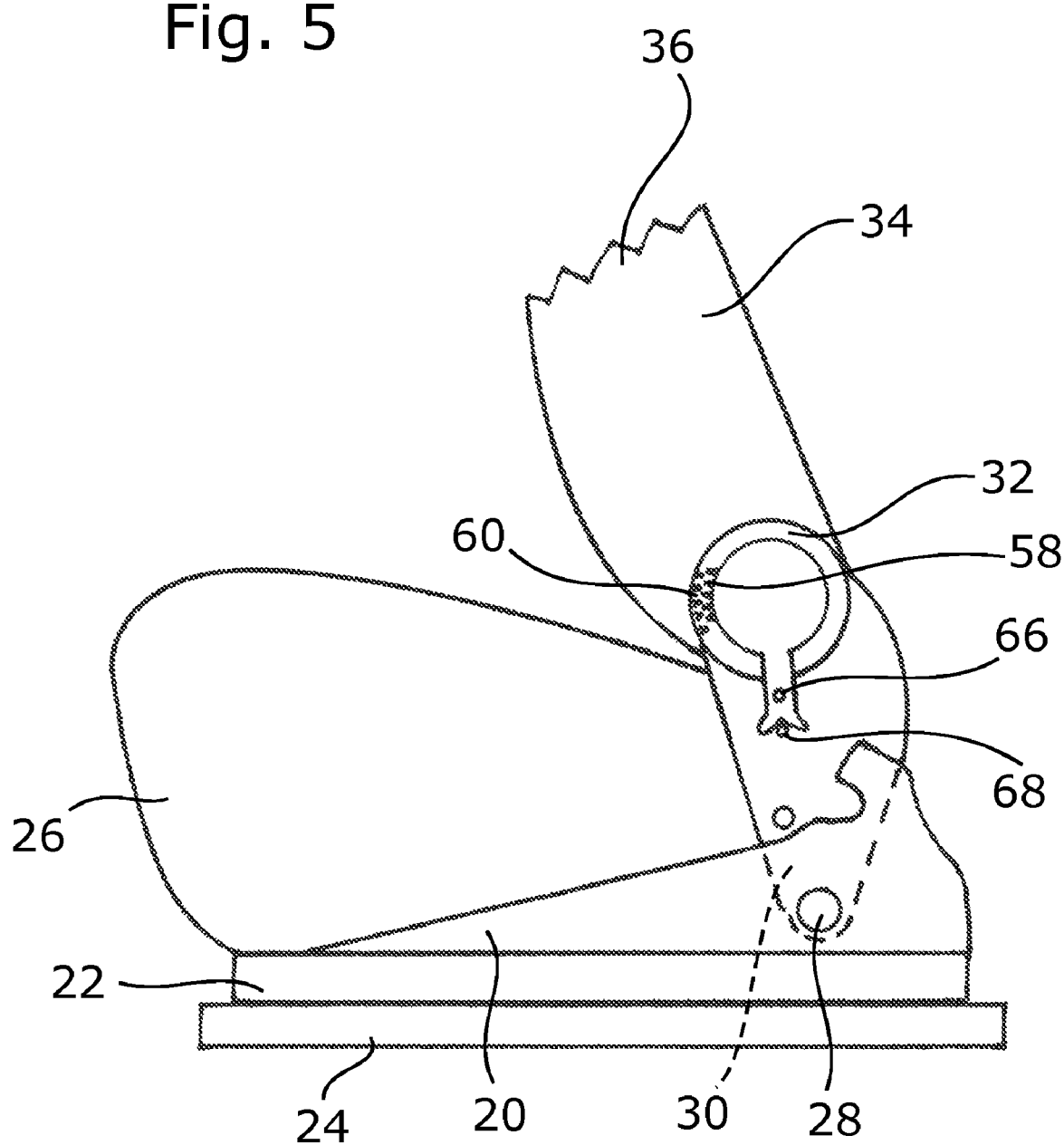
FIG. 5: is a view according to FIG. 1, but for a fourth exemplary embodiment, the detent part is now configured to be a mass part.

In the fourth exemplary embodiment shown in FIG. 5, the detent part is configured to be a mass part. It has a disk-shaped mass and is pivotal about a pivot 66 with respect to the lower hinge arm 30. It is retained in the position shown by a spring-biased ball 68 that engages a lower fork. The two prongs of the fork are configured such that when the mass part is pivoted sufficiently about the pivot 66 the ball engages into a lower recess of a prong, elastically biasing and maintaining the locked position in this condition. The release position is shown. The mass part has a toothed surface feature corresponding to the detent projection 58. On the hinge mounting 32 there is formed a toothed inner surface feature that corresponds to the detent bight 60. The mass part leaves the release position when the acceleration exceeds a given value as it occurs in crash conditions of motor vehicles. An acceleration threshold is here used at which the acceleration absorbers in air bags also respond.

The following combination of the first and the fourth exemplary embodiment is possible: In view of the illustration shown in FIG. 5, another cam is added, which has no detent projection and does not directly interact with the hinge mounting but which instead, as soon as it is in its release position, actuates the mass part for it to come into the stop position. As soon as the cam has been brought back into the detent position, the mass part adopts again its release position as it is shown in FIG. 5 and can engage in the event of an accident.

Figure 6:
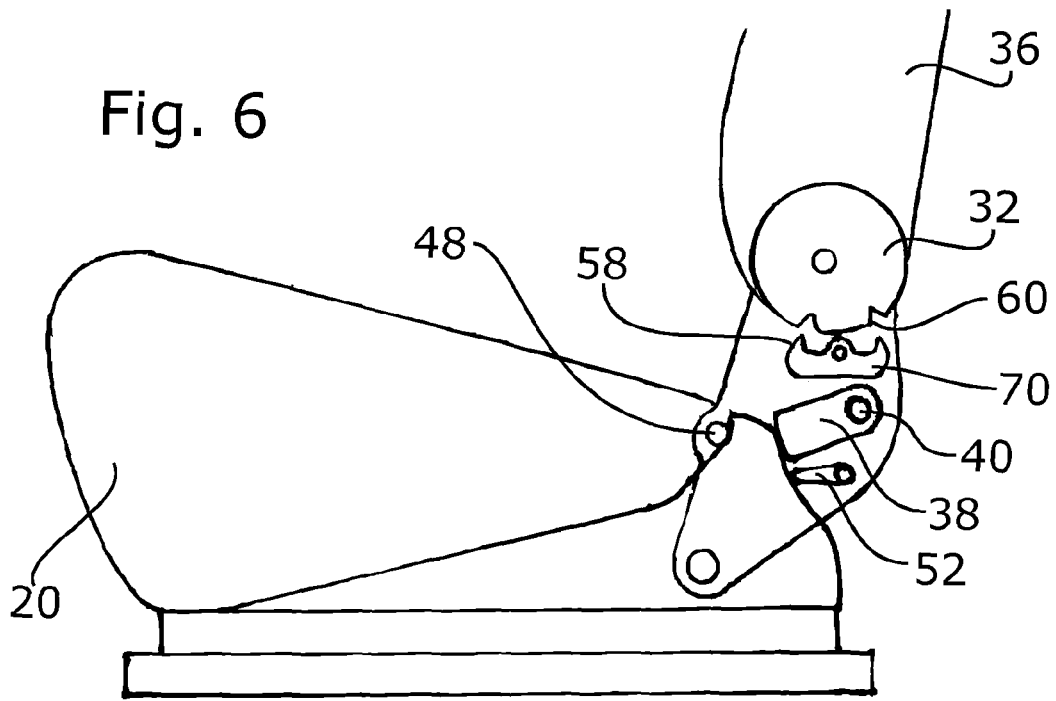
FIG. 6: is a view like FIG. 1, but for a fifth exemplary embodiment, the detent projection is now provided on a movable mass part and not on the cam.
Figure 7:
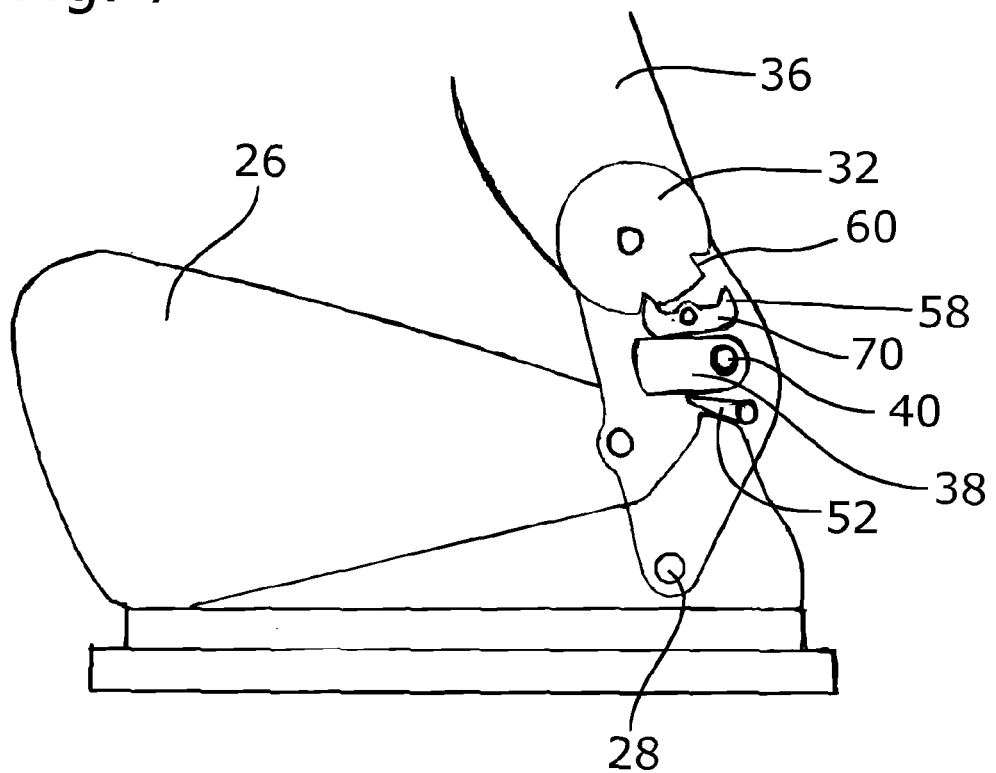
FIG. 7: is a view according to FIG. 6, but now in the forward tilted condition of the seat back, the detent part is engaged.

The fifth exemplary embodiment shown in the FIGS. 6 and 7 shows a possible combination of this type. Here, the detent part 70 is again a mass part. It is retained in the normal position shown in FIG. 6 in which it is not engaged with one of the detent bights 60 of the hinge mounting. Upon acceleration due to an accident, this retaining means is overcome and the detent part 70 comes into engagement with the detent bights 60 in the same way as described for the fourth exemplary embodiment.

Further, there is provided a cam 38 as it is known from prior art. It now has a detent projection of its own. In the normal position as shown in FIG. 6, it is in the stop position on the clamping flank. It is not in contact with the detent part.

Upon tilting the seat back into the position shown in FIG. 7, the cam holder 52 prevents the cam 38 from falling downward. During the movement, the cam 38 comes to rest against the detent part 70 and pivots it for the detent projection 58 to come into the engagement position shown in FIG. 7.

When the seat back is pivoted back, the cam 38 comes free from the detent part. Under the action of the retaining means, the detent part 70 again adopts the position shown in FIG. 6, in which its detent projection 58 is no longer engaged with the detent bights 60.

FIG. 8 shows the side of the motor vehicle seat opposite the side shown in FIGS. 1-7. This side of the seat has a locking device 35.

What is claimed is:

1. A forward tiltable motor vehicle seat comprising: a seat carrier, a seat back and a hinge mounting for adjusting the inclination of said seat back, said hinge mounting being arranged between said seat carrier and said seat back, being associated with said seat back and having (a) an upper hinge arm connected to said seat back, (b) a lower hinge arm hinged to said seat carrier about a forward tilt axis, (c) a hinge mounting axis about which the upper hinge arm and lower hinge arm are rotatable relative to each other and (d) a locking device on one side of said seat for locking said relative rotation between said upper hinge arm and said lower hinge arm around said hinge mounting axis, and said hinge mounting further comprising a shaft connecting said locking device on the one side of said seat with the other side of said seat, wherein on said other side of said seat said hinge mounting does not have said locking device and also has on said other side of the said seat at least one detent bight that is arranged to move together with said upper hinge arm, a movable detent part on said lower hinge arm comprising at least one detent projection that cooperates with said detent bight, is normally not engaged with said detent bight and is, in a position of said seat back in which said seat back is tilted forward about said forward tilt axis, one of at least ready for engagement with said detent bight and engaged therewith.

2. The forward tiltable motor vehicle seat as set forth in claim 1, wherein the seat carrier forms a clamping flank, the detent part is configured to be a cam disposed on the lower hinge arm, is movable between a stop position and a release position, and abuts the clamping flank in the stop position.

3. The forward tiltable motor vehicle seat as set forth in claim 2, further comprising a cam holder located beneath the cam, the cam holder fits against the cam in a release position of the cam and supports the cam toward the bottom.

4. The forward tiltable motor vehicle seat as set forth in claim 3, wherein the cam holder is disposed on the lower hinge arm or on the cam.

5. The forward tiltable motor vehicle seat as set forth in claim 3, wherein the cam holder fits against an underside of the cam.

6. The forward tiltable motor vehicle seat for a motor vehicle as set forth in claim 1, wherein the detent part is configured to be a mass part that senses an acceleration of the associated motor vehicle, the mass part is pivotally disposed on the lower hinge arm, is movable between a release position and a stop position, is normally in a release position, and automatically pivots into a stop position in case a given threshold of acceleration is reached.

7. The forward tiltable motor vehicle seat as set forth in claim 6, wherein a spring is associated with the mass part and retains the mass part in the release position.

8. The forward tiltable motor vehicle seat as set forth in claim 6, wherein a dead center spring is associated with the mass part and retains the mass part in engagement with the detent bight in the stop position.

9. The forward tiltable motor vehicle seat as set forth in claim 1, wherein a limit stop is disposed on the lower hinge arm.

10. The forward tiltable motor vehicle seat as set forth in claim 1, wherein the detent bight is connected to the upper hinge arm.

11. The forward tiltable motor vehicle seat as set forth in claim 1, wherein the seat back is rotatable about said hinge mounting axis.

12. The forward tiltable motor vehicle seat as set forth in claim 1, wherein the seat further comprises a frame.

13. The forward tiltable motor vehicle seat as set forth in claim 1, wherein the shaft is coaxial with the hinge mounting axis.

14. The forward tiltable motor vehicle seat as set forth in claim 1, wherein the upper hinge arm is solidly connected to the seat back.

* * * * *